US008699561B2

(12) United States Patent
Liu et al.

(10) Patent No.: US 8,699,561 B2
(45) Date of Patent: Apr. 15, 2014

(54) SYSTEM AND METHODS FOR DETECTING AND HANDLING ERRORS IN A MULTI-THREADED VIDEO DATA DECODER

(75) Inventors: Shan Liu, Cambridge, MA (US); Jason N. Wang, San Jose, CA (US); Milan Mehta, Newark, CA (US)

(73) Assignee: Sony Computer Entertainment Inc., Tokyo (JP)

( * ) Notice: Subject to any disclaimer, the term of this patent is extended or adjusted under 35 U.S.C. 154(b) by 1967 days.

(21) Appl. No.: 11/844,287

(22) Filed: Aug. 23, 2007

(65) Prior Publication Data

US 2008/0049844 A1 Feb. 28, 2008

Related U.S. Application Data

(60) Provisional application No. 60/823,605, filed on Aug. 25, 2006, provisional application No. 60/823,613, filed on Aug. 25, 2006, provisional application No. 60/823,620, filed on Aug. 25, 2006.

(51) Int. Cl.
*H04B 1/66* (2006.01)

(52) U.S. Cl.
USPC .......................................... 375/240

(58) Field of Classification Search
None
See application file for complete search history.

(56) References Cited

U.S. PATENT DOCUMENTS

| | | | | |
|---|---|---|---|---|
| 5,786,858 A | * | 7/1998 | Yagasaki et al. | 375/240.15 |
| 6,198,849 B1 | * | 3/2001 | Fischer et al. | 382/232 |
| 6,404,817 B1 | * | 6/2002 | Saha et al. | 375/240.27 |
| 6,542,549 B1 | * | 4/2003 | Tan et al. | 375/240.26 |
| 6,987,805 B1 | * | 1/2006 | Weckel et al. | 375/240 |
| 7,516,456 B2 | * | 4/2009 | Aguilar et al. | 718/102 |
| 2003/0138045 A1 | * | 7/2003 | Murdock et al. | 375/240.12 |
| 2005/0254584 A1 | * | 11/2005 | Kim et al. | 375/240.27 |
| 2006/0098734 A1 | * | 5/2006 | Cho et al. | 375/240.03 |
| 2007/0074206 A1 | * | 3/2007 | Iwamoto | 718/1 |

OTHER PUBLICATIONS

Sio Kei Im "An Efficient Data Classification Scheme With the H.264 Flexible Macroblock Order", 2009 IEEE, p. 1135-1139.*
U.S. Appl. No. 60/823,605 to Shan Liu et al., entitled "System and Methods for Detecting and Handling Errors in a Multi-Threaded Video Data Decoder", filed Aug. 25, 2006.
U.S. Appl. No. 60/823,613 to Shan Liu, entitled "Methods and Apparatus for Concealing Corrupted Blocks of Video Data", filed Aug. 25, 2006.
U.S. Appl. No. 60/823,620 to Xun Xu, entitled "Entropy Decoding Methods and Apparatus", filed Aug. 25, 2006.

(Continued)

*Primary Examiner* — Luu Pham
*Assistant Examiner* — Brian Olion
(74) *Attorney, Agent, or Firm* — Joshua D. Isenberg; JDI Patent

(57) ABSTRACT

Apparatus and methods for decoding streaming data containing one or more coded pictures in which each picture contains a plurality of slices and each slice containing a plurality of macroblocks are disclosed. A first decoding subtask is performed on all macroblocks in the coded picture or a section thereof. After performing the first decoding subtask on all macroblocks in the coded picture or a section thereof, a second decoding subtask is performed on all the macroblocks in the coded picture or section thereof. One or more of the first and second tasks includes examining a slice or macroblock within the coded picture to determine if there are any errors, and if an error is present, handling the error.

32 Claims, 9 Drawing Sheets

(56) References Cited

OTHER PUBLICATIONS

U.S. Appl. No. 11/844,302, to Shan Liu, entitled "Methods and Apparatus for Concealing Corrupted Blocks of Video Data", filed Aug. 23, 2007.

U.S. Appl. No. 11/844,319, to Xun Xu, entitled "Entropy Decoding Methods and Apparatus", filed Aug. 23, 2007.

Sony Computer Entertainment Incorporated, "Cell Broadband Engine Architecture", Version 1.0, Aug. 8, 2005.

* cited by examiner

SYSTEM AND METHODS FOR DETECTING AND HANDLING ERRORS IN A MULTI-THREADED VIDEO DATA DECODER

PRIORITY CLAIM

This application claims the benefit of priority provisional application No. 60/823,605, to Shan Liu, Jason Wang and Milan Mehta entitled "SYSTEM AND METHODS FOR DETECTING AND HANDLING ERRORS IN A MULTI-THREADED VIDEO DATA DECODER" filed Aug. 25, 2006, the entire disclosures of which are incorporated herein by reference.

This application claims the benefit of priority provisional application No. 60/823,613, to Shan Liu, entitled "METHODS AND APPARATUS FOR CONCEALING CORRUPTED BLOCKS OF VIDEO DATA" filed Aug. 25, 2006, the entire disclosures of which are incorporated herein by reference.

This application claims the benefit of priority provisional application No. 60/823,620, to Xun Xu, entitled "ENTROPY DECODING METHODS AND APPARATUS", filed Aug. 25, 2006 the entire disclosures of which are incorporated herein by reference.

CROSS-REFERENCE TO RELATED APPLICATION

This application is related commonly-assigned, co-pending application Ser. No. 11/844,302, to Shan Liu, entitled "METHODS AND APPARATUS FOR CONCEALING CORRUPTED BLOCKS OF VIDEO DATA", filed the same day, as the present application, the entire disclosures of which are incorporated herein by reference.

This application is related commonly-assigned, co-pending application Ser. No.11/844,319, to Xun Xu, entitled "ENTROPY DECODING METHODS AND APPARATUS", filed the same day, as the present application, the entire disclosures of which are incorporated herein by reference.

FIELD OF THE INVENTION

Embodiments of the present invention are related to streaming media and more particularly to detecting and handling errors in streaming media.

BACKGROUND OF THE INVENTION

Digital signal compression is widely used in many multimedia applications and devices. Digital signal compression using a coder/decoder (codec) allows streaming media, such as audio or video signals to be transmitted over the Internet or stored on compact discs. A number of different standards of digital video compression have emerged, including H.261, H.263; MPEG-1, MPEG-2, MPEG-4; and AVC (H.264). These standards, as well as other video compression technologies, seek to efficiently represent a video frame picture by eliminating the spatial and temporal redundancies in the picture and among successive pictures. Through the use of such compression standards, video contents can be carried in highly compressed video bit streams, and thus efficiently stored in disks or transmitted over networks.

Unfortunately, the storage media and networks are not always reliable, so that errors may occur during storage or transmission. Thus, some video stream data may be corrupted, which may result in termination of decoding/playing; or, if the decoding continues, some damaged picture frames or partial frames. Such errors may propagate to the following pictures, due to the predictive nature of video compression. Overall, errors result in poor video playback; therefore, they need to be properly handled in order to mitigate their impact.

MPEG-4 AVC (Advanced Video Coding), also known as H.264, is a video compression standard that offers significantly greater compression than its predecessors. The H.264 standard is expected to offer up to twice the compression of the earlier MPEG-2 standard. The H.264 standard is also expected to offer improvements in perceptual quality. As a result, more and more video content is being delivered in the form of AVC(H.264)-coded streams. Two rival DVD formats, the HD-DVD format and the Blu-Ray Disc format support H.264/AVC High Profile decoding as a mandatory player feature. AVC(H.264) coding is described in detail in "Draft of Version 4 of H.264/AVC (ITU-T Recommendation H.264 and ISO/IEC 14496-10 (MPEG-4 part 10) Advanced Video Coding)" by Gary Sullivan, Thomas Wiegand and Ajay Luthra, Joint Video Team (JVT) of ISO/IEC MPEG & ITU-T VCEG (ISO/IEC JTC1/SC29/WG11 and ITU-T SG16 Q.6), 14th Meeting: Hong Kong, CH 18-21 January, 2005, the entire contents of which are incorporated herein by reference for all purposes.

Errors in video streams may be categorized into two types: fatal errors and non-fatal errors. Fatal errors usually come from incorrect header syntax, such as syntax elements in block, macroblock, slice, picture and sequence headers. Non-fatal errors, by contrast, mostly exist in the data part, such as incorrect motion vector and coefficient values. A standard (e.g. MPEG-1/2/4, H.261/3/4, etc.) decoder without embedded error handling mechanism is fragile. When it encounters a fatal error, the decoder usually asserts from decoding and the display stops or freezes as a result. If the error is non-fatal, the decoder may continue decoding through the error data; however, the display may be corrupted with annoying visual artifacts.

In order to protect video stream data from errors, some conventional error detection and correction methods have been applied to standard video coders. For example, parity, checksum, cyclic redundancy check (CRC), vertical redundancy check, horizontal redundancy check and rectangular redundancy check are varieties of error-checking mechanisms; forward error correction (FEC) and automatic repeat request (ARQ) are two ways to correct found errors. These methods can provide some degree of error detection and correction by inserting redundant bits into the video stream. Since they were originally designed for general file transfer over networks, they do not utilize natural video characteristics, such as high content correlations in one picture and among successive pictures; and thus, they are not very efficient solutions for handling video errors. Furthermore, errors can happen anywhere in a video stream, both in syntax and in residue data, and can affect both large and small chunks of data. It can be very costly or impractical to protect against and correct these errors using conventional methods such as CRC and FEC.

Therefore, there is the need for "high level" error handling system and methods, which take advantages of video characteristics and thus detect and conceal video errors more efficiently. This invention provides the system and methods for efficient error detecting and handling in such a multi-threaded decoding infrastructure.

BRIEF DESCRIPTION OF THE DRAWINGS

The teachings of the present invention can be readily understood by considering the following detailed description in conjunction with the accompanying drawings, in which.

DESCRIPTION OF THE SPECIFIC EMBODIMENTS

Although the following detailed description contains many specific details for the purposes of illustration, anyone of ordinary skill in the art will appreciate that many variations and alterations to the following details are within the scope of the invention. Accordingly, the exemplary embodiments of the invention described below are set forth without any loss of generality to, and without imposing limitations upon, the claimed invention.

In order to more efficiently utilize the processing power of hardware devices, multi-threaded compression and decompression may be applied to coders (both encoder and decoder). In a multi-threaded decoder, video syntax decoding and data decoding/image reconstruction are usually separated in different threads. The syntax decoding thread is prior to the data decoding/reconstruction thread, that is, the header syntax of the present picture and all slices, macroblocks, sub-macroblocks, etc. are decoded before the data decoding/reconstruction of the first macroblock. (Note: a macroblock is generally considered as the basic unit of video coding.) In the syntax decoding thread, if any error data, this macroblock is marked as erroneous macroblock and then concealed the same as those erroneous macroblocks detected in syntax decoding thread. Note that in this thread, only the macroblocks which contain errors are marked erroneous macroblocks, but not the following ones. The header syntax elements prior to the error point are considered correctly decoded; the rest, i.e. those header syntax elements after the error point, may be recovered using the same methods that are used for recovering macroblock header syntax elements in previous syntax decoding thread. Examples of methods for recovering macroblock header syntax according to embodiments of the present invention are described in details below. Examples of methods for concealing macroblock pixels are extensively discussed in U.S. Provisional Patent Application 60/823,613, which has been incorporated herein by reference.

Figure 1:
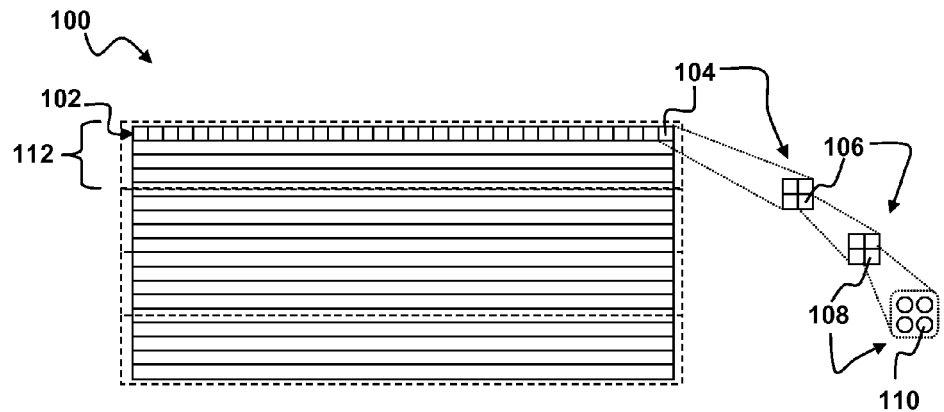
FIG. 1 is a schematic diagram illustrating division of a picture for multithreaded decoding according to an embodiment of the present invention.

Streaming data may be broken down in suitable sized units for handling. For example, in the case of video data, the streaming data is broken down into pictures with each picture representing a particular image in a series of images. As shown in FIG. 1, a single picture 100 may be broken down into a number of slices 102. Each slice 102 contains one or more rows of macroblocks 104. The number of macroblocks in a row depends on the size of the macroblocks and the size and resolution of the picture 100. For example, if each macroblock contains sixteen pixels then the number of macroblocks in each row may be determined by dividing the width of the picture 100 (in pixels) by sixteen. Each macroblock 104 may be broken down into a number of sub-macroblocks 106. Each sub-macroblock 106 may be broken down into a number of blocks 108 and each block may contain a number of pixels 110. By way of example, and without limitation of the invention, in a common video coding scheme, each macroblock 104 may be broken down into four sub-macroblocks 106. Each sub-macoblock may be broken down into four blocks 108 and each block may contain four pixels 110.

Conventionally, streaming video images have been decoded using a single thread for the decoding of each picture. In a conventional Single thread decoder all decoding tasks for one macroblock are completed before decoding the next macroblock. Multithreaded picture decoding—i.e., decoding multiple pictures in parallel, may also be done. In such multithreaded picture decoding, each picture gets its own thread. It is relatively straightforward to duplicate a single thread decoder to implement multithreading. However, to simultaneously decode two or more pictures there must be sufficient memory to hold all of the pictures being decoded. Consequently, this simple type of multithreading is limited by the amount of available memory. If memory is not sufficient to implement parallelism on multiple pictures parallelism may alternatively be implemented within pictures.

In embodiments of the present invention, multi-threaded decoding may be implemented within a picture. In other words, different portions of the task of decoding a single picture may be implemented in parallel. The process of streaming video decoding may be sped up by breaking up the decoding of a single picture into multiple threads that are executed in parallel. To facilitate multi-threaded decoding within pictures each picture 100 may be broken down into two or more sections 112. Each section 112 may encompass one or more slices. In embodiments of the present invention it is possible for a slice 102 to "straddle" the boundary between to adjacent sections 112. Thus, a slice may be shared between to sections.

It is noted that each picture may be either a frame or a field. A frame refers to a complete image. A field is a portion of an image used for to facilitate displaying the image on certain types of display devices. Generally, the pixels in an image are arranged in rows. To facilitate display an image may sometimes be split by putting alternate rows of pixels into two different fields. The rows of pixels in the two fields can then be interlaced to form the complete image. For some display devices, such as cathode ray tube (CRT) displays, the two fields may simply be displayed one after the other in rapid succession. The afterglow of the phosphors used in the CRT screen combined with the persistence of vision results in the two fields being perceived as a continuous image. For other display devices, such as liquid crystal displays, it may be necessary to interlace the two fields into a single picture before being displayed. Streaming data representing encoded images typically includes information indicating whether the image is a field or a picture. Such information may be included in a header to the image.

Figure 2:
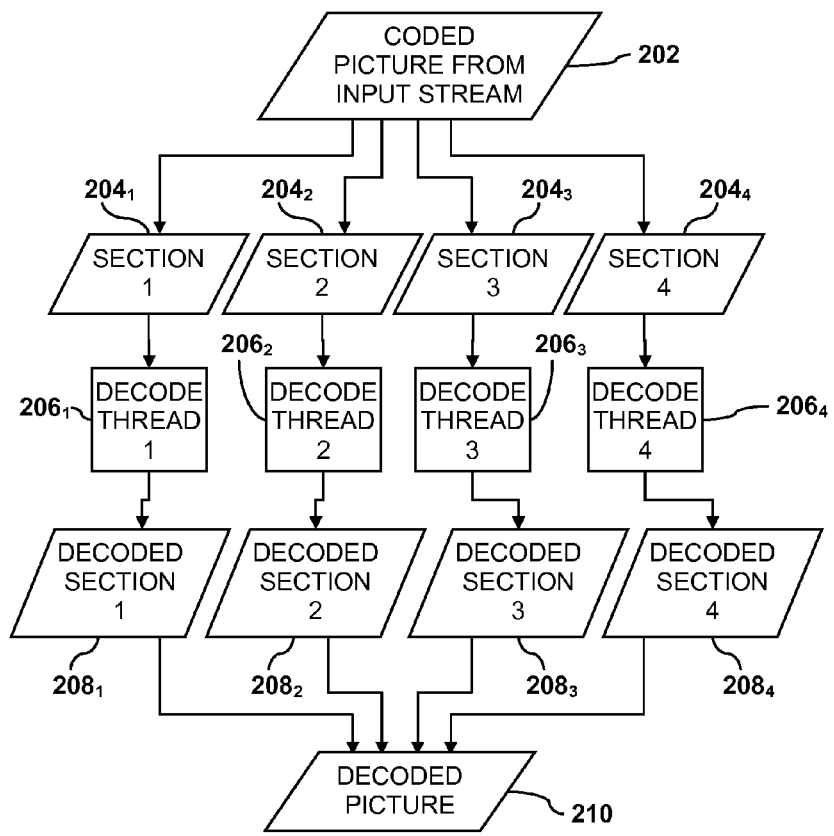
FIG. 2 is a flow diagram illustrating intra-picture multi-threaded decoding according to an embodiment of the present invention.

Each section 112 may be decoded in separate threads, which may be processed in parallel. For example, as shown in FIG. 2 a streaming video picture 202 may be broken down into four sections $204_1$, $204_2$, $204_3$ and $204_4$. The sections $204_1$, $204_2$, $204_3$ and $204_4$ are respectively decoded in separate threads $206_1$, $206_2$, $206_3$ and $206_4$ to produce decoded sections $208_1$, $208_2$, $208_3$ and $208_4$. The decoded sections may then be combined to display a decoded picture 210.

It is important to choose the right size for the sections $204_1$, $204_2$, $204_3$ and $204_4$. in order to obtain the best performance. If the sections are too big, e.g., there are not enough of sections in the picture to which they belong, it may be difficult to take advantage of parallelism in the decoding process. If there are too many sections there are too many sink points and the performance of the multithreaded decoding process may suffer as a result. The right size for the sections $204_1$, $204_2$, $204_3$ and $204_4$ may depend on a number of factors such as the picture format and the type of processor. By way of example and without limitation, if the picture format is 1080i and the pictures are decoded using a Cell processor, each picture may be broken into four sections for intra-picture multithreaded decoding.

In some embodiments of the present invention, the number of macroblocks per section may be determined based on the performance of the processor implementing the decoding. If particular macroblocks require fewer cycles to decode more of such macroblocks may be included in a section. Macroblocks corresponding to a blank screen are an example of macroblocks requiring relatively few cycles to decode. By contrast fewer macroblocks may be passed to a section if those macroblocks require a relatively large number of cycles to decode. Control over the number of macroblocks to put in the sections $204_1$, $204_2$, $204_3$ and $204_4$ may be based on a profile of the streaming data 201. Such a profile may be encoded in the streaming data itself. Alternatively, the profile may be generated at a previous level of decoding such as network adaptive layer decoding. Such decoding may provide information on the number of bits in each picture. From number of bits per picture an estimate may be made of the number of cycles required to decode a block, macroblock, slice or picture. The number of cycles may then be used to determine the number of macroblocks to put into each of the sections $204_1$, $204_2$, $204_3$ and $204_4$.

Figure 3:
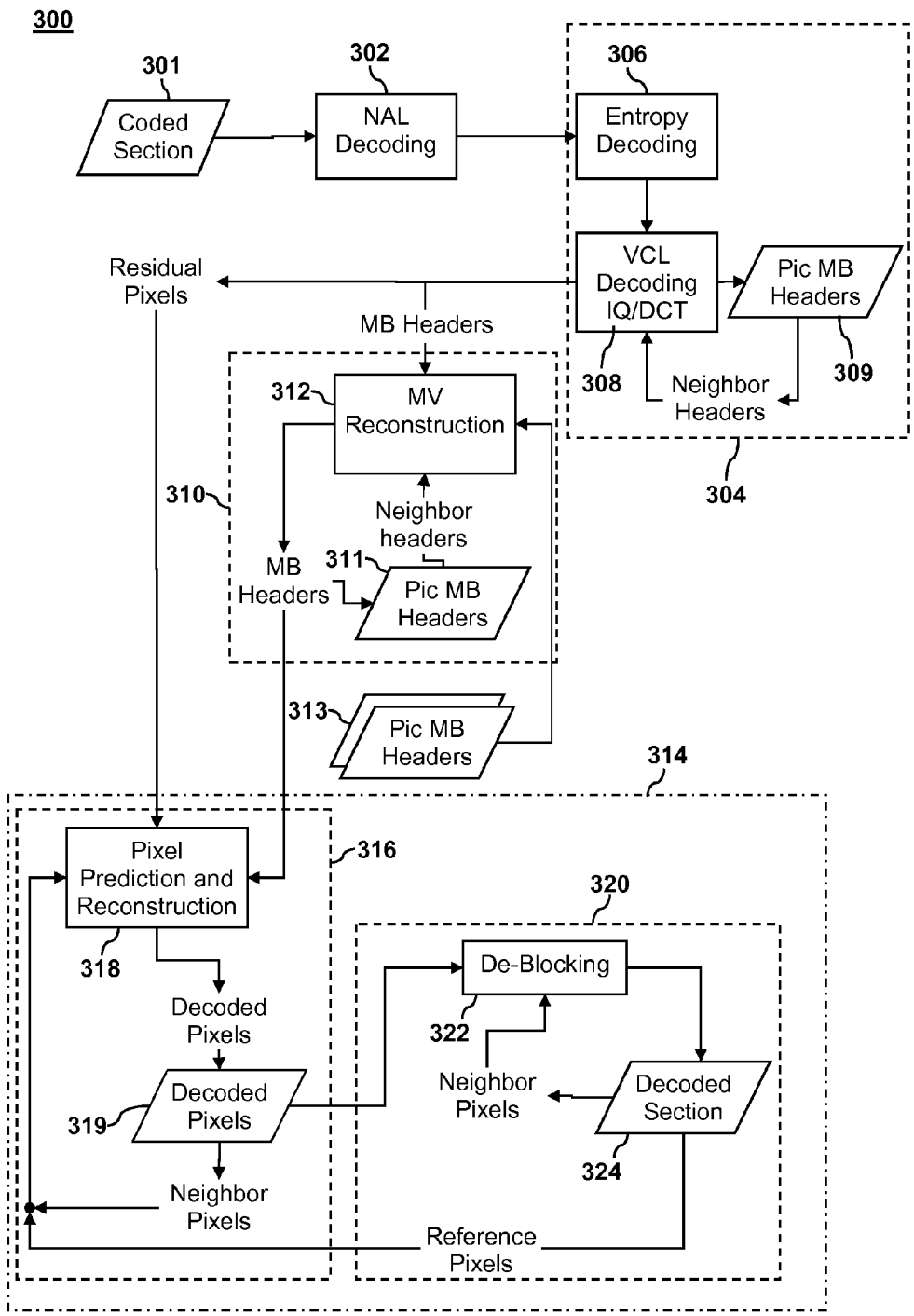
FIG. 3 is a flow diagram illustrating the general process flow in streaming data decoding.

The decoding threads $206_1$, $206_2$, $206_3$, $206_4$ may each be broken down into a number of stages. FIG. 3 illustrates an example of a possible process flow in a method 300 for decoding of streaming data 301 within each of the decoding threads $206_1$, $206_2$, $206_3$, $206_4$. Where coded streaming data 301 e.g., a video data bitstream) has been transferred over a network, e.g., the Internet, the data 301 may initially undergo a process referred to as network abstraction layer (NAL) decoding, indicated at 302. NAL decoding may remove from the data 301 information added to assist in transmitting the data. Such information, referred to as a "network wrapper" may identify the data 301 as video data or indicate a beginning or end of a bitstream, bits for alignment of data, and/or metadata about the video data itself In addition, by way of example, the network wrapper may include information about the data 301 including, e.g., resolution, picture display format, color palette transform matrix for displaying the data, information on the number of bits in each picture, slice or macroblock, as well as information used in lower level decoding, e.g., data indicating the beginning or ending of a slice. This information may be used to determine the number of macroblocks to pass to each of the task groups in a single section.

After NAL decoding at 302, the remaining decoding illustrated in FIG. 3 may be implemented within each thread in three different thread groups or task groups referred to herein as video coded layer (VCL) decoding 304, motion vector (MV) reconstruction 310 and picture reconstruction 314. The picture reconstruction task group 314 may include pixel prediction and reconstruction 316 and de-blocking 320. In embodiments of the present invention, these tasks groups may be chosen based on data dependencies such that each task group may complete its processing of all the macroblocks in a picture (e.g., frame or field) or section before the macroblocks are sent to the next task group for subsequent processing. Specifically, all macroblocks in a picture or section may undergo VCL decoding 304 before being sent to the motion vector reconstruction task group 310. VCL decoding 304 often includes a process referred to as Entropy Decoding 306, which is used to decode the VCL syntax. Many codecs, such as AVC(H.264), use a layer of encoding referred to as entropy encoding. Entropy encoding is a coding scheme that assigns codes to signals so as to match code lengths with the probabilities of the signals. Typically, entropy encoders are used to compress data by replacing symbols represented by equal-length codes with symbols represented by codes proportional to the negative logarithm of the probability. AVC(H.264) supports two entropy encoding schemes, Context Adaptive Variable Length Coding (CAVLC) and Context Adaptive Binary Arithmetic Coding (CABAC). Since CABAC tends to offer about 10% more compression than CAVLC, CABAC is favored by many video encoders in generating AVC(H.264) bitstreams. Decoding the entropy layer of AVC(H.264)-coded data streams can be computationally intensive and may present challenges for devices that decode AVC(H.264)-coded bitstreams using general purpose microprocessors. To decode high bit-rate streams targeted by the Blu-ray or the HD-DVD standards, the hardware needs to be very fast and complex, and the overall system cost could be really high. One common solution to this problem is to design special hardware for CABAC decoding. Alternatively, entropy decoding may be implemented in software. An example of a software implementation of entropy decoding may be found in U.S. Provisional Patent Application No. 60/823,620, to Xun Xu, entitled "ENTROPY DECODING METHODS AND APPARATUS", which has been incorporated herein by reference as indicated above.

Subsequently, all macroblocks in the picture or section may undergo motion vector reconstruction 310 before being sent to the picture reconstruction task group 314. Within the picture reconstruction task group 314 all macroblocks in the picture or section may undergo pixel prediction and reconstruction 316 in conjunction with de-blocking 320. The pixel prediction and reconstruction task 316 and the de-blocking task 320 may be pipelined to enhance the efficiency of decoding. For example, pixel prediction and reconstruction 316 may be performed on one macroblock and followed by de-blocking 320. Reference pixels from the decoded picture obtained by de-blocking 320 may be used in pixel prediction and reconstruction 316 on subsequent macroblocks.

Certain codecs may use a form of data compression that involves transformation of the pixel information from a spatial domain to a frequency domain. One such transform, among others, is known as a discrete cosine transform (DCT). The decoding process for such compressed data involves the inverse transformation from the frequency domain back to the spatial domain. In the case of data compressed using DCT, the inverse process is known as inverse discrete cosine transformation (IDCT). The transformed data is sometimes quantized to reduce the number of bits used to represent numbers in the discrete transformed data. For example, numbers 1, 2, 3 may all be mapped to 2 and numbers 4, 5, 6 may all be mapped to 5. To decompress the data a process known as inverse quantization (IQ) is used before performing the inverse transform from the frequency domain to the spatial domain.

The VCL decoding process 304 may involve inverse quantization (IQ) and/or inverse discrete cosine transformation (IDCT) as indicated at 308. These processes may decode the headers 309 and data from macroblocks. The decoded headers 309 may be used to assist in VCL decoding of neighboring macroblocks. The MV reconstruction process 310 may involve motion vector reconstruction 312 using headers from a given macroblock 311 and/or its neighbors 313. A motion vector describes apparent motion within a picture. Such motion vectors allow reconstruction of a picture (or portion thereof) based on knowledge of the pixels of a prior picture and the relative motion of those pixels from picture to picture. Once the motion vector has been recovered pixels may be reconstructed at 316 using a process of pixel prediction based on residual pixels from the VCL decoding process 304 and motion vectors from the MV reconstruction process 310. Pixel prediction and reconstruction 318 produces decoded pixels 319 that include neighbor pixels which may be used as inputs to the pixel prediction and reconstruction process 318 for a subsequent macroblock. The de-blocking task group 320 includes a de-blocking stage 322 that produces a decoded picture 324. The decoded picture 324 may provide neighboring pixels for use in de-blocking a neighboring macroblock. In addition, decoded pictures 324 may provide reference pixels for pixel prediction and reconstruction 318 for subsequent macroblocks.

Errors may arise in the decoding process, e.g., as a result of errors in generating or transmitting the coded data 301. Error handling within the different thread groups of each decoding thread may be implemented in accordance with embodiments of the present invention. Although embodiments of the error handling system and methods described herein are particularly advantageous for multi-threaded decoders, they can be used in single-threaded decoders as well, with minor modifications. It is noted that the decoding method 300 may be implemented on complete pictures from streaming data (e.g., frames or fields) without having to break them into sections. A significant amount of multi-threading may be used to implement decoding even if the images are not broken up into sections.

Figure 4A:
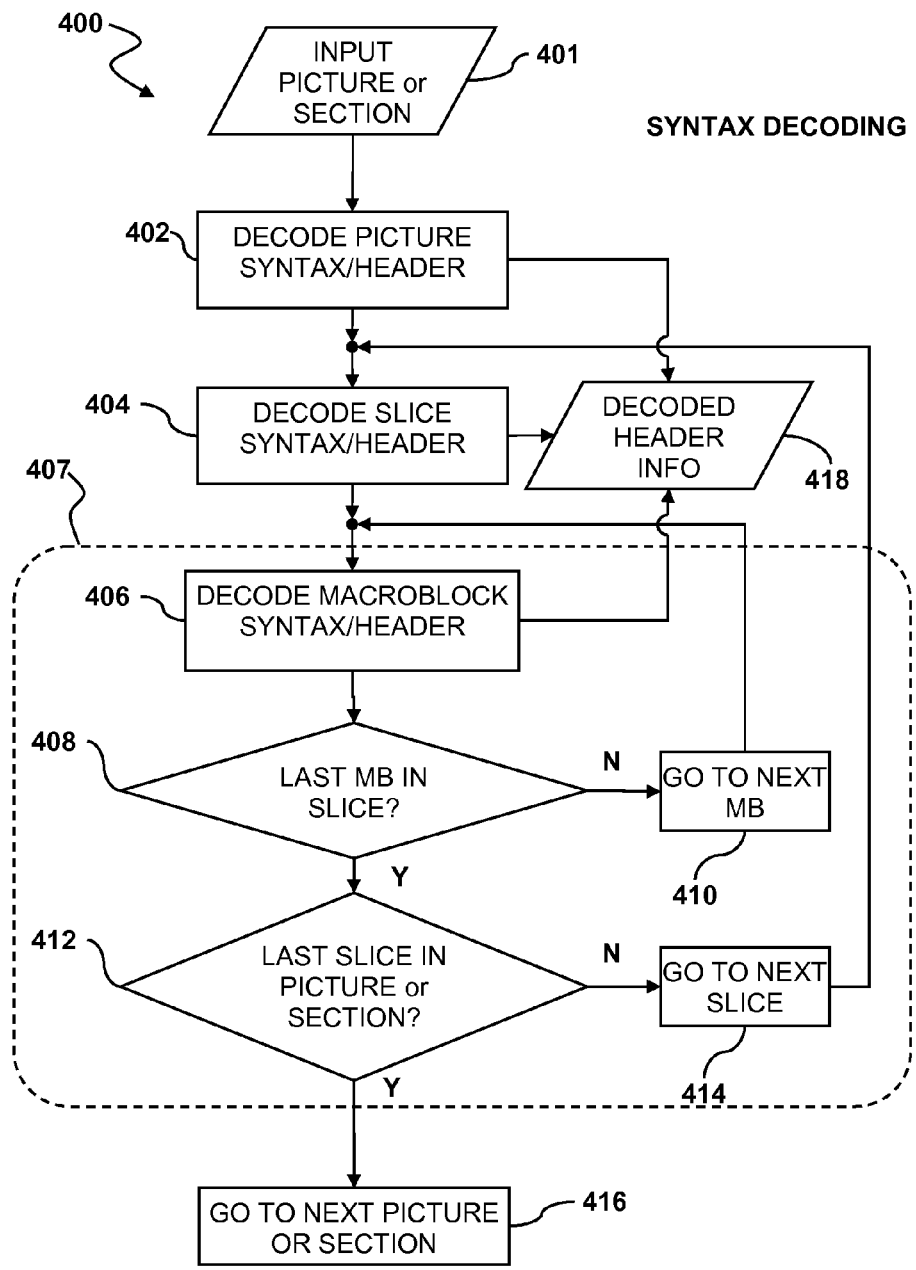
FIG. 4A is a flow diagram illustrating syntax decoding in multi-threaded decoding of a picture according to an embodiment of the present invention.
Figure 4B:
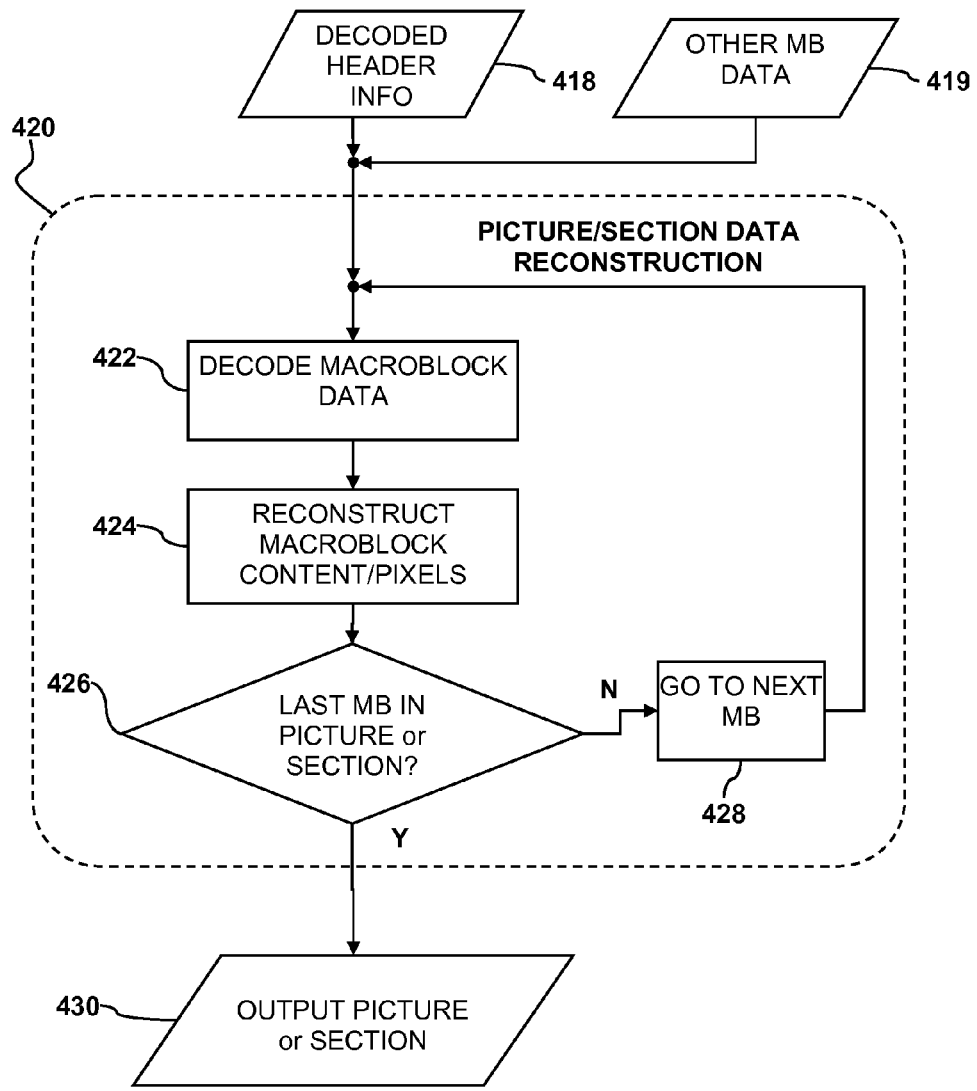
FIG. 4B is a flow diagram illustrating picture/data reconstruction in multi-threaded decoding of a picture according to an embodiment of the present invention.

FIGS. 4A-4B illustrate an example of how a multi-threaded decoder may decode the syntax of input streaming data, e.g., an input video picture, then decodes the data and reconstructs it in two separate threads, respectively. These two threads may be implemented in parallel. For example, once the picture and slice header syntax have been decoded the decoded information may be used for decoding all the macroblocks in that slice and picture. Then the header for a macroblock may be decoded in the syntax decoding thread (e.g., as shown in FIG. 4A and the macroblock header syntax information may be sent to the macroblock decoding thread, e.g., as shown in FIG. 4B while decoding the next macroblock header. In the syntax decoding thread 400 shown in FIG. 4B, the picture header, slice header and all macroblock (sub-macroblock; block, etc.) headers from an input picture or section are decoded at 402, 404 and 406 respectively. In embodiments of the present invention, picture header syntax decoding at 402 and slice header syntax decoding 402 may be performed as part of a NAL decoding module (e.g., as indicated at 302 of FIG. 3). The macroblock header syntax decoding 406 may be implemented as part of a VCL decoding thread group 407, which may have features in common with the VCL decoding thread group 304 of FIG. 3). If at 408 the decoded macroblock is not the last macroblock in a slice processing proceeds to the next macroblock as indicated at 410. Otherwise, if at 412 the slice is not the last slice in a picture (e.g., frame or field) or section processing may being on the next slice, as indicated at 414. Otherwise, processing may begin on the next section or picture, if one exists, as indicated at 416. If any errors are detected during any of these stages, error handling functions, such as macroblock header syntax concealment, may be implemented.

Decoded header information 418 from the syntax decoding thread 400 may be used in one or more picture reconstruction threads. An example of a picture reconstruction thread 420 is shown in FIG. 4B. In the reconstruction thread 420, remaining macroblock data 419 (e.g., data from motion vector reconstruction 310) may be decoded as indicated at 422. Each macroblock may then be reconstructed at 424, either from decoded contents, or from error concealment. In a single-threaded decoder, syntax decoding, data decoding and reconstruction can be done in either one macroblock loop (per picture or section) or in two separate loops as shown in FIGS. 4A-4B. Embodiments of the present invention can be applied to either case.

Figure 5:
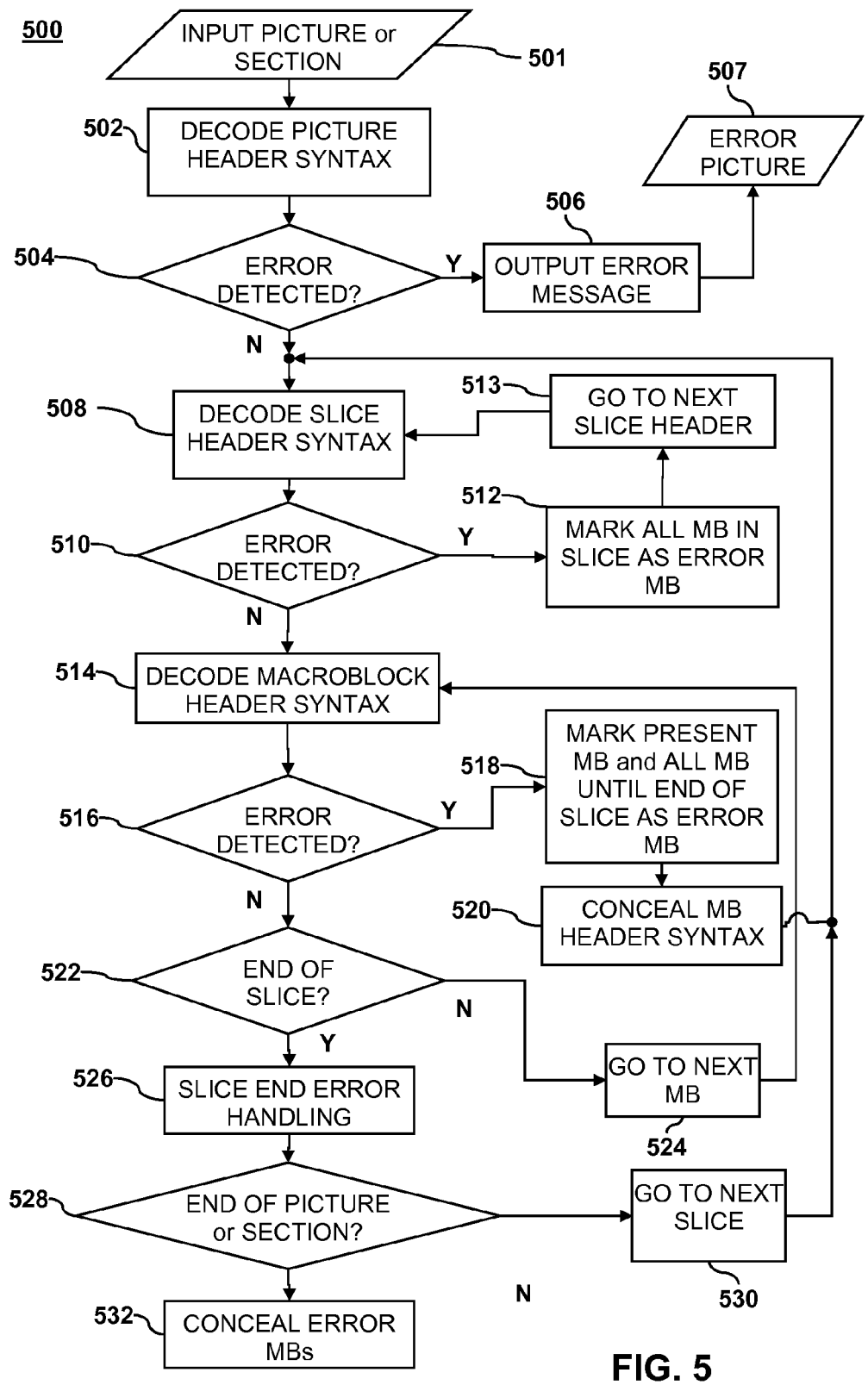
FIG. 5 is a flow diagram illustrating error handling in a syntax decoding thread according to an embodiment of the present invention.

FIG. 5 illustrates an example of a method 500 for detecting and handling errors in a syntax decoding thread according to an embodiment of the present invention. First, the picture (e.g., frame or field) header syntax is decoded at 502 and examined by the decoder at 504. If any error is detected at 504, the decoder outputs error message at 506. Errors may be detected at 504, e.g., by comparing the header syntax against standard that defines acceptable or "legal" values or ranges for the various elements that make up the header syntax. An error may be present if the value of a syntax element lies outside the "legal" range for that element as defined by the standard. Alternatively, even if a syntax element violates a semantic rule. For example, even if a syntax element value is legal, an error message may be generated if the value violates some constraint of the streaming standard used in transmitting the data. In such a case the stream cannot be accepted as a valid stream. For example, a syntax element may indicate that the input picture 501 is a bi-predictive (B) picture, but B pictures are not allowed in this stream. Alternatively, two legal syntax element values may conflict with each other in some way.

The decoder may also output some default error picture 507, such as a black picture or the previously decoded picture, etc. Otherwise, if no errors are found at 504, the decoder continues decoding the first slice header at 508. If there is any error detected in the slice header syntax at 510, all macroblocks in this slice are marked as erroneous macroblocks at 512, e.g., by setting a flag in the macroblock header, and the decoder passes by the bit stream until the beginning of the next slice as indicated at 513. It is noted that the decoding and error handling up to this point may be implemented at the NAL decoding stage, e.g., as indicated at 302 of FIG. 3.

If the slice header is successfully decoded at 510, the decoder begins decoding the headers of the macroblocks in the slice at 514. Decoding the macroblock headers may be implemented in the VCL decoding thread, e.g., as indicated at 304 of FIG. 3. If at 516, an error is detected in the header syntax of macroblock, that macroblock and all following macroblocks up to and including the last macroblock of the present slice are marked as erroneous macroblocks as indicated at 518. The header syntax for these erroneous macroblocks may then be concealed after they are marked as indicated at 520. The decoder may then proceed to the next slice, e.g., by decoding the slice header syntax at 508. An example of macroblock header syntax concealment is explained with respect to FIG. 7 below.

Macroblock header concealment for a given macroblock often requires the use of macroblock header information from the previously decoded macroblock. To enhance performance it may be desirable to mark and conceal each macroblock header in the slice in a serial fashion, e.g., mark the first macroblock then conceal it and then mark the next macroblock and conceal it and so on until the last macroblock in the slice. Marking and concealing the macroblock headers in this manner may optimize performance, e.g., if there is limited memory space available for buffering the macroblock headers. If available memory permits, the decoder may alternatively mark the relevant macroblocks and then conceal them after the last one has been marked.

If no error is detected in the macroblock header at 516, the decoder determines if the end of slice is met at 522, e.g., by checking the "slice_end" marker and/or determining if the number of decoded macroblocks has met the slice size. If at 522 the slice end has not been met the decoder goes to the next macroblock at 524 and repeats decoding the next macroblock at header 514. If, at 522, the slice end has been reached the decoder proceeds to slice end error handling at 526. An example of slice end error handling is described below with respect to FIG. 6. The decoder determines, at 528, if the end of the picture or section has been reached. If the end of picture or section has not been reached, the decoder goes to the next slice as indicated at 530 and starts decoding the next slice at 508. Otherwise, the syntax decoding of a picture is finished for the picture or section and the macroblocks marked as erroneous macroblocks at 512 and/or 518 may be concealed as indicated at 532. The decoder may then proceed to implement the method 500 on the next section.

There are a number of different ways to conceal error macroblocks. Concealment may depend on whether the error macroblock has been inter coded or intra coded. An intra coded macroblock intra prediction to provide an estimate of the sample value or data element currently being decoded. In intra prediction the prediction is derived from the decoded samples of the same decoded slice. For an inter coded macroblock, the prediction is derived from decoded samples of reference pictures other than the current decoded picture. For example, as suggested in H.264/AVC decoder extension, if the error macroblock is an intra coded macroblock, it may be concealed from the boundary pixels of its four direct neighbor macroblocks. To calculate the value for a pixel in an intra coded macroblock, both the weighted average of the top and bottom reference pixels, and that of the left and right reference pixels, are calculated. The average of the two is the concealed value for the pixel in the corrupted intra macroblock. If the number of correct neighbors are equal or greater than 2, then only correctly decoded neighbors are used as reference; otherwise, both correct and concealed neighbors are used.

If the block is inter coded, it is usually recovered from one or more matching blocks in one or more previously reconstructed reference pictures. The matching block in the reference picture may be either collocated block with respect to the error block in the present picture, or located with motion compensation, using recovered motion vectors. The motion vectors of the corrupted video block may be recovered from the motion vectors of neighbor blocks, such as suggested in H.264/AVC decoder extension. The neighbor motion vectors (of 16×16 macroblock, 8×8 sub-macroblock or average of 4×4, 4×8 block) may be examined by the "boundary-matching" method, and the motion vector set with the minimum boundary-matching error is selected to be the concealed motion vectors.

Alternatively, error macroblock concealment may be implemented as set forth in U.S. Provisional Patent Application 60/823,613, to Shan Liu, entitled "METHODS AND APPARATUS FOR CONCEALING CORRUPTED BLOCKS OF STREAMING DATA", which has been incorporated herein by reference.

Figure 6:
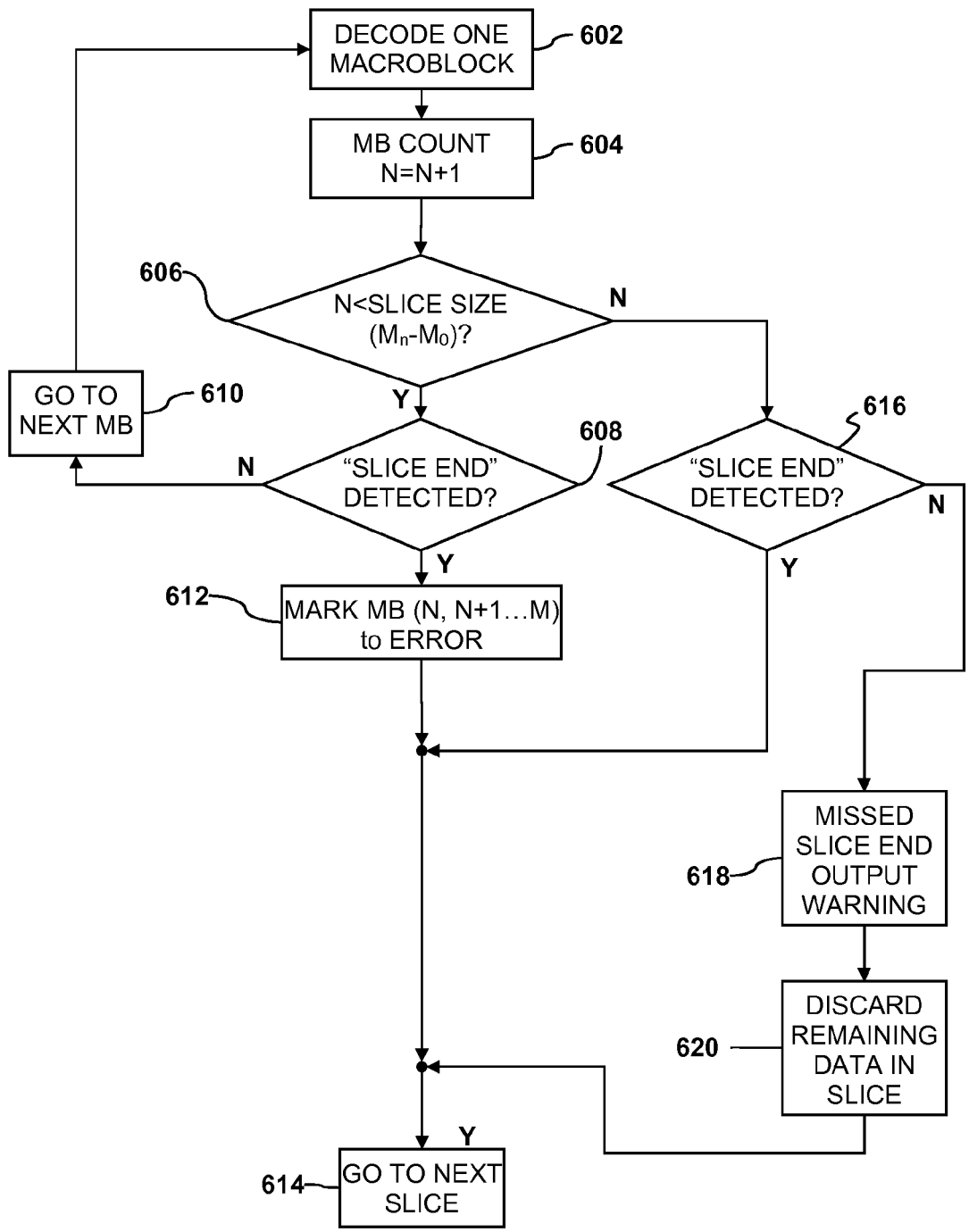
FIG. 6 is a flow diagram illustrating error handling for a missing and mistakenly caught slice end according to an embodiment of the present invention.

There are a number of different error handling scenarios that may arise in streaming data decoding. One such scenario may arise if the decoder misses detector or mistakenly catches a slice_end. FIG. 6 illustrates an example of an error handling method 600 for the such a scenario according to an embodiment of the present invention. Such error handling may be implemented as part of the VCL decoding thread 304 of FIG. 3. A macroblock count N is initially set to some value, e.g., zero. The macroblock count N represents the number of macroblocks decoded since the beginning of a slice. After a macroblock header is decoded at 602, the macroblock count N increases by one as indicated at 604. At 606 N is then compared with a slice size ($M_n$-$M_0$), where $M_n$ and $M_0$ are the indexes of the last and first macroblocks of the present slice. If N<($M_n$-$M_0$) at 606, that means the end of slice should not have been reached and there should be more macroblocks in the slice to decode. If not slice end is detected at 608, the decoder may proceed to the next macroblock as indicated at 610 and decode it at 602. However, if at 608 the decoder finds the slice buffer empty (or slice_end marker in some cases), it means that an end of slice has been met in the bit stream. This may happen, e.g., if an error has occurred somewhere in the middle of the slice and one or more macroblock headers consumed more bits then they should have. In this case, the undetected errors may be ignored, but the remaining (i.e. N, N+1, . . . , $M_j$) macroblocks are marked as erroneous macroblocks at 612 and the decoder proceeds to the next slice at 614 (assuming the end of the picture has not been reached). The macroblocks marked as error macroblocks at 612 may be concealed in a subsequent picture reconstruction thread after all the slices in the picture or section have been processed.

On the other hand, if at 606 the macroblock count N is found to be equal to or greater than ($M_n$-$M_0$), the decoder determines whether a slice_end has been detected at 616. If the slice end has been detected at 616 the decoder proceeds to the next slice at 614. If at the slice_end has not been detected at 616 this indicates means that some errors have happened and an erroneous macroblock header consumed less bits than it should. In such a case, the decoder may generate a missed slice end warning at 618. The remaining bits in the stream may be discarded for the remainder of the slice at 620. The decoder may then jump to the beginning of the next slice at 614. It is noted that in implementation the method 600, no extra memory is required for the bits that are to be discarded or macroblocks that are marked as erroneous.

Figure 7:
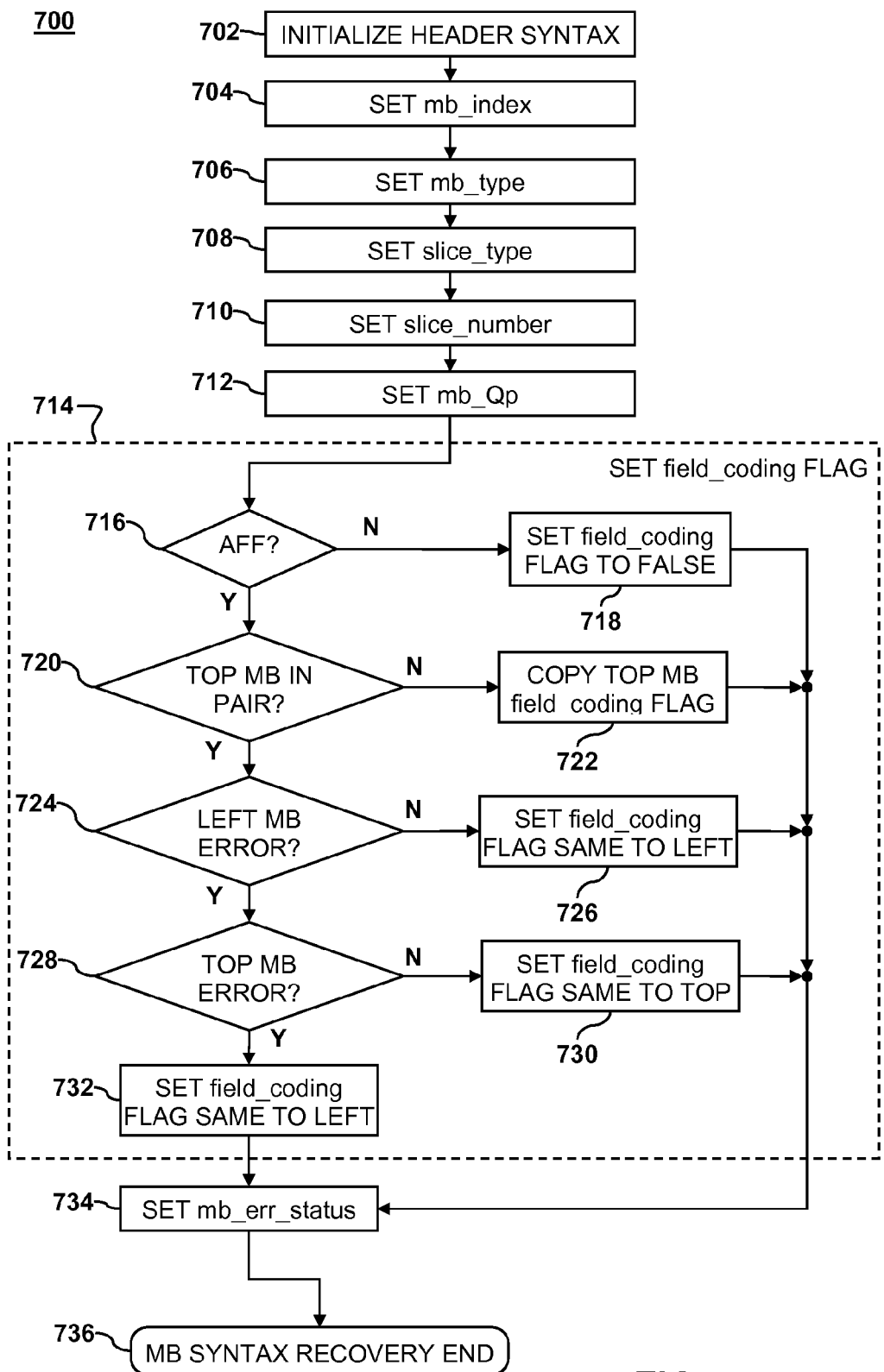
FIG. 7 is a flow diagram illustrating recovery of erroneous macroblock header syntax elements according to an embodiment of the present invention.

FIG. 7 illustrates an example of a method 700 for recovering syntax elements of detected erroneous macroblocks. The method 700 may be implemented within the VCL decoding thread 304 of FIG. 3. There are a number of macroblock syntax elements, among which, some are necessary for error handling and concealment. Examples of such macroblock syntax elements include macroblock index (mb_index), macroblock type (mb_type), slice type, slice number, macroblock quantization parameter (mb_Qp), macroblock field coding flag (field_coding) and macroblock error status flag (mb_err_status). The mb_index of a corrupted macroblock may be recovered at 702 from the macroblock count N described above. The mb_type may be set to intra at 704 so that some functions related to inter coding will not be processed and related parameters will not be decoded so that computational power is reduced. The slice_type and slice_number may be inherited at 708 and 710 respectively from previously decoded slice syntax. A slice (average) Qp may be used as mb_Qp for corrupted macroblocks at 712.

The field_coding flag may be recovered in a recovery routine 714. Some background on field coding is useful to facilitate understanding recovery of the field_coding flag. In field coding pairs of vertically adjacent macroblocks may be associated together. Some compression standards (e.g., AVC (H.264) specify a syntax and decoding process for video that originated in either progressive-scan or interlaced-scan form, which may be mixed together in the same sequence. A field generally refers to an assembly of alternate rows of a frame. A frame is composed of two fields, referred to as a top field and a bottom field. Each row of a bottom field is spatially located immediately below a corresponding row of a top field. A macroblock containing samples from a single field is referred to as a field macroblock. All macroblocks of a coded field are field macroblocks. When macroblock-adaptive frame/field (AFF) decoding is in use, some macroblocks of a coded frame may be field macroblocks.

For both frame and field coding, vertically adjacent macroblocks may be grouped together in macroblock pairs. The macroblock within a macroblock pair that contains the samples in the top row of samples for the macroblock pair is referred to as the top macroblock and is conventionally identified as MB0. The macroblock within a macroblock pair that contains the samples in the bottom row of samples for the macroblock pair is referred to as the bottom macroblock and is conventionally identified as MB1. A macroblock pair decoded as two field macroblocks is referred to as a field macroblock pair. A macroblock pair decoded as two frame macroblocks is referred to as a frame macroblock pair. For a field macroblock pair, the bottom macroblock represents the samples from the region of the bottom field of the frame that lie within the spatial region of the macroblock pair and the top macroblock represents samples form the region of the top field of the frame that lie within the spatial region of the macroblock pair. For a frame macroblock pair, the bottom macroblock represents the samples of the frame that lie within the bottom half of the spatial region of the macroblock pair and the top macroblock represents the samples of the frame that lie within the top half of the spatial region of the macroblock pair.

The nearest neighboring macroblocks to the macroblock pair may be identified as shown in Table I.

TABLE I

| | | |
|---|---|---|
| $MB0_{TL}$ | $MB0_T$ | $MB0_{TR}$ |
| $MB1_{TL}$ | $MB1_T$ | $MB1_{TR}$ |
| $MB0_L$ | $MB0$ | $MB0_R$ |
| $MB1_L$ | $MB1$ | $MB1_R$ |
| $MB0_{BL}$ | $MB0_B$ | $MB0_{BR}$ |
| $MB1_{BL}$ | $MB1_B$ | $MB1_{BR}$ |

In Table I, a 0 and 1 indicate whether a macroblock is the upper or lower macroblock in a macroblock pair. The subscripts TL, T, TR, BL, B, and BR respectively indicate whether a macroblock pair relative is located to the top left, top, top right, left, right, bottom left, bottom or bottom right of the macroblock pair in the center of the table.

Recovery of the field coding flag at 714 may proceed as follows. First it is determined at 716 whether adaptive frame/field coding (AFF) is in use. If not, the field_coding flag may be set to false at 718. Otherwise, the field_coding flag may be recovered from a previously decoded or recovered top and left macroblock syntax. For example, if at 720 it is determined that the erroneous macroblock is the bottom macroblock in a field coded macroblock pair, the top macroblock field coding flag value may be copied from the top macroblock in the pair as indicated at 722. If the error macroblock is the top macroblock in the pair then, if at 724 it is determined that the macroblock to the left of the error macroblock was correctly decoded, then the flag of the present macroblock follows that of the top neighbor as indicated at 726. Otherwise, if it is determined at 728 that the top macroblock was correctly decoded, then the flag follows that of the top neighbor macroblock to the error macroblock as indicated at 730. Note that if the top macroblock was not correctly decoded it may have been concealed. Thus, if neither top nor left macroblock was correctly decoded, the flag for the error macroblock may follow that of the concealed top neighbor macroblock as indicated at 732. Finally, the mb_err_status is set to ERROR to indicate this is an erroneous macroblock. The mb_err_status may be set to CONCEAL after the macroblock is concealed in later reconstruction thread. If no error was detected mb_err_status may be set to SUCCESS.

Figure 8:
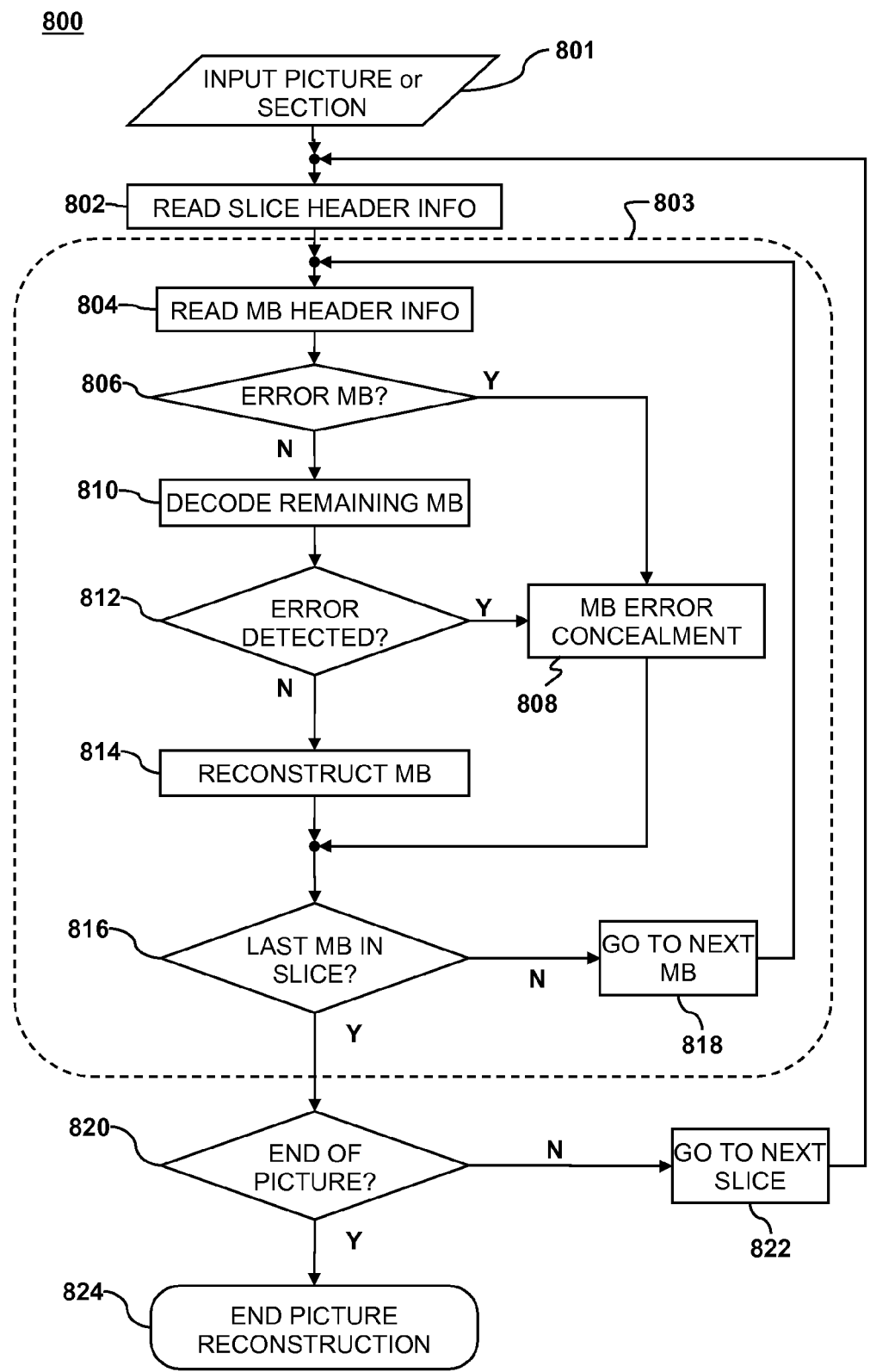
FIG. 8 is a flow diagram illustrating error handling in a picture reconstruction thread according to an embodiment of the present invention.

Error handling may also arise in the context of a picture reconstruction thread. FIG. 8 illustrates an example of method 800 that implements an error handling scenario in a reconstruction thread for an input picture 801. The decoder reads picture header and slice header information at 802. The picture and slice header information may have been decoded in a previous syntax decoding thread (e.g., the NAL decoding thread 302 from FIG. 3) and stored in a buffer, from which the decoder may read the information. Then the decoder enters a macroblock loop 803, to decode the remaining data of each macroblock. and reconstruct it. At 804 the decoder reads the macroblock header information. If at 806 it is determined that the macroblock has been marked as erroneous macroblock (e.g., by some header syntax) in the syntax decoding thread (e.g., VCL decoding thread 304), it is sent to error an concealment module 808 without further decoding and decoding 810, error detection 812 and reconstruction 814 may be skipped. If the macroblock has not been marked as erroneous, the decoder proceeds to decode the remaining macroblock data at 810. If decoder detects any error at 812 in the remaining macroblock data, the macroblock is marked as an erroneous macroblock and sent to error the concealment module 808 without further decoding and reconstruction 814 may be skipped. Otherwise, the macroblock is fully decoded and reconstructed.

The error concealment module 808 reconstructs the corrupted macroblock using previously decoded macroblock pixels in the present or previously decoded pictures. A detailed example of error concealment methods is described in co-U.S. Provisional Patent Application 60/823,613, to Shan Liu entitled "METHODS AND APPARATUS FOR CONCEALING CORRUPTED BLOCKS OF STREAMING DATA", which has been incorporated herein by reference as indicated above.

The macroblock loop 803 of the decoder determines whether the last macroblock in the slice has been encountered at 816. If not, the macroblock loop proceeds to process the next macroblock as indicated at 818. If the last macroblock in a slice has been encountered it is determined at 820 whether the end of the picture has been encountered. If not, the decoder proceeds to the next slice at 822. After all macroblocks for each slice in the picture have been reconstructed (or concealed), the picture reconstruction ends as indicated at 824.

Figure 9:
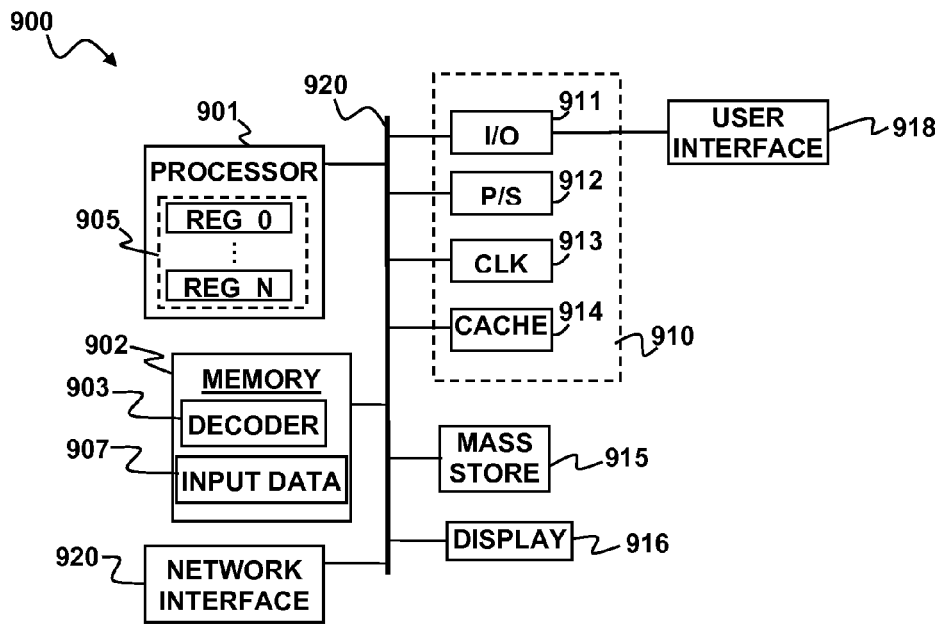
FIG. 9 is a block diagram illustrating an apparatus for error handling in video data decoding according to an embodiment of the present invention.

FIG. 9 illustrates a block diagram of a computer apparatus 900 that may be used to implement decoding of streaming data as described above. The apparatus 900 generally includes may include a processor module 901 and a memory 902. The processor module 901 module may include a single processor or multiple processors. As an example of a single processor, the processor module 901 may include a Pentium microprocessor from Intel or similar Intel-compatible microprocessor. As an example of a multiple processor module, the processor module 901 may include a Cell processor. Cell processors are described, e.g., in Cell processors are described, e.g., in *Cell Broadband Engine Architecture*, which is available online at: http://www-306.ibm.com/chips/techlib/techlib.nsf/techdocs/1AEE1270EA2776387257060006E61BA/$file/CBEA_01_pub.pdf, which is incorporated herein by reference.

The memory 902 may be in the form of an integrated circuit, e.g., RAM, DRAM, ROM, and the like). The memory may also be a main memory or a local store of a synergistic processor element of a cell processor. A computer program 903 may be stored in the memory 902 in the form of processor readable instructions that can be executed on the processor module 901. The processor module 901 may include one or more registers 905 into which compressed signal input data 907 may be loaded from memory 902 for processing. The computer program 903 may be a decoder program configured to decode the compressed signal data, e.g., as described above with respect to FIGS. 2, 3, 4A, and/or 4B and implement error handling, e.g., as described above with respect to any or all of FIG. 5, FIG. 6, FIG. 7, and FIG. 8. The program 903 may be written in any suitable processor readable language, e.g., e.g., C, C++, JAVA, Assembly, MATLAB, FORTRAN and a number of other languages. The apparatus 900 may also include well-known support functions 910, such as input/output (I/O) elements 911, power supplies (P/S) 912, a clock (CLK) 913 and cache 914. The device 900 may optionally include a mass storage device 915 such as a disk drive, CD-ROM drive, tape drive, or the like to store programs and/or data. The device 900 may also optionally include a display unit 916 and user interface unit 918 to facilitate interaction between the device 900 and a user. The display unit 916 may be in the form of a cathode ray tube (CRT) or flat panel screen that displays text, numerals, graphical symbols or images. The user interface 918 may include a keyboard, mouse, joystick, light pen or other device that may be used in conjunction with a graphical user interface (GUI). The apparatus 900 may also include a network interface 920 to enable the device to communicate with other devices over a network, such as the internet. These components may be implemented in hardware, software or firmware or some combination of two or more of these.

The methods described above with respect to FIG. 2, FIG. 3, FIG. 4, FIG. 5, FIG. 6, FIG. 7 and FIG. 8 may be implemented with a processing module capable of implementing parallel processing. In particular, different sections of a picture may be processed in parallel. As used herein processing in parallel means that, to some extent the processing of different tasks overlaps in time. Table II below gives an example of how the different task groups of FIG. 3 may be processed in parallel on four different sections of a picture over the course of six intervals of time.

TABLE II

| int | SECTION 1 | SECTION 2 | SECTION 3 | SECTION 4 |
|-----|-----------|-----------|-----------|-----------|
| 1 | VCL DECODING | | | |
| 2 | MV RECONSTRUCTION | VCL DECODING | | |
| 3 | PICTURE RECONSTRUCTION | MV RECONSTRUCTION | VCL DECODING | |
| 4 | | PICTURE RECONSTRUCTION | MV RECONSTRUCTION | VCL DECODING |
| 5 | | | PICTURE RECONSTRUCTION | MV RECONSTRUCTION |
| 6 | | | | PICTURE RECONSTRUCTION |

Figure 10:
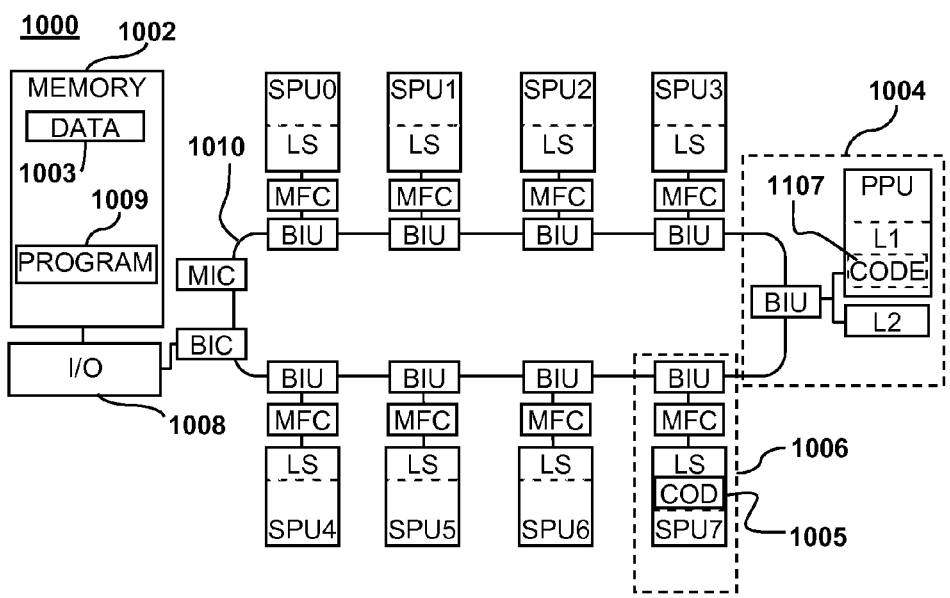
FIG. 10 is a block diagram illustrating an example of a cell processor implementation of error handling in multi-threaded video data decoding according to an embodiment of the present invention.

It is noted that other parts of the decoding process, such as NAL decoding may be implemented in parallel with VCL decoding, Motion Vector reconstruction and Picture Reconstruction using the type of "staggered" illustrated in Table II. Such parallel processing may be implemented with a processing module capable of implementing parallel processing. As used herein processing in parallel means that, to some extent the processing of different tasks overlaps in time. One example, among others of a processing module capable of implementing parallel processing is a cell processor. There are a number of different processor architectures that may be categorized as cell processors. By way of example, and without limitation, FIG. 10 illustrates a type of cell processor 1000. By way of example, the cell processor 1000 may be characterized by an architecture known as a Cell Broadband engine architecture (CBEA)-compliant processor. For the purposes of example, the cell processor 1000 is depicted as having only a single SPE group and a single PPE group with a single SPE and a single PPE. Alternatively, a cell processor can include multiple groups of power processor elements (PPE groups) and multiple groups of synergistic processor elements (SPE groups). Hardware resources can be shared between units within a group. However, the SPEs and PPEs must appear to software as independent elements.

The cell processor 1100 includes a main memory 1002, a single PPE 1004 and eight SPEs 1006. However, the cell processor 1001 may be configured with any number of SPE's. With respect to FIG. 10, the memory, PPE, and SPEs can communicate with each other and with an I/O device 1008 over a ring-type element interconnect bus 1010. The memory 1002 contains input data 1003 having features in common with the input data 1002 described above and a program 1009 having features in common with the program 1008 described above. At least one of the SPE 1006 may include in its local store entropy decoding instructions 1005 having features in common with the decoding program 1004 described above. The PPE may include in its L1 cache, code 1007 instructions having features in common with the overall decoding program 806 described above. Instructions 1005, 1007 may also be stored in memory 1002 for access by the SPE and PPE when needed.

Embodiments of the invention provide error handling system and methods for video decoders. Such embodiments may be applied to most video decoders, in particular, H.264/AVC decoders and, more particularly, to products that have video decoder as a module. Examples of such products include but are not limited to video game consoles, DVD players, software (PC) video decoder/player, video on cell phones, and the like.

While the above is a complete description of the preferred embodiment of the present invention, it is possible to use various alternatives, modifications and equivalents. Therefore, the scope of the present invention should be determined not with reference to the above description but should, instead, be determined with reference to the appended claims, along with their full scope of equivalents. Any feature described herein, whether preferred or not, may be combined with any other feature described herein, whether preferred or not. In the claims that follow, the indefinite article "A" or "An" refers to a quantity of one or more of the item following the article, except where expressly stated otherwise. The appended claims are not to be interpreted as including means-plus-function limitations, unless such a limitation is explicitly recited in a given claim using the phrase "means for."

What is claimed is:

1. A method for decoding streaming data containing one or more coded pictures, each picture containing a plurality of slices, each slice containing a plurality of macroblocks, the method comprising:
    determining a number of macroblocks in a section of the coded picture before performing a first decoding subtask on all macroblocks in the section, wherein determining the number of macroblocks in the section includes basing the number of macroblocks in the section on an estimated number of processor cycles required to perform processing of the first decoding subtask or a subsequent second decoding subtask;
    performing the first decoding subtask on all macroblocks in the section; and
    after performing the first decoding subtask on all macroblocks in the coded picture or a section thereof, performing the second decoding subtask on all the macroblocks in the section;
    wherein one or more of the first and second tasks includes examining a slice or macroblock within the coded picture to determine if there are any errors, wherein examining a slice or macroblock within the coded picture to determine if there are an errors includes decoding a given macroblock; incrementing a macroblock count; comparing the macroblock count to a slice size; and determining whether a slice end has been detected for the slice containing the given macroblock and if an error is present, handling the error;
    wherein examining a slice or macroblock includes examining a header for a given macroblock within the picture, and wherein, if an error is detected within the header for the given macroblock, handling the error includes marking the given macroblock as an error macroblock and marking as error macroblocks all macroblocks following the given macroblock until and end of the slice within which the given macroblock is located;
    wherein handling the error includes marking the given macroblock and all subsequent macroblocks in the slice as error macroblocks if the macroblock count is less than the slice size and the slice end has been detected.

2. The method of claim 1, wherein performing the first decoding task and performing the second decoding task includes performing the first and second decoding tasks on all the macroblocks in a first section of the coded picture to form a first decoded section in parallel with performing the first and second decoding tasks on all the macroblocks in a second section of the coded picture to form a second decoded section.

3. The method of claim 2, further comprising combining the two or more decoded sections to form a decoded picture.

4. The method of claim 1, wherein the first decoding task includes a video coded layer (VCL) decoding task group and wherein the second decoding task includes a motion vector reconstruction task group or a picture reconstruction task group.

5. The method of claim 1, wherein handling the error further comprises concealing the header for the given macroblock and all the macroblocks following the given macroblock until and end of the slice within which the given macroblock is located.

6. The method of claim 1, further comprising:
    prior to performing the first decoding task, decoding a slice header syntax for a slice within the picture and, if an error is detected, marking all macroblocks within the slice as error macroblocks.

7. The method of claim 6, further comprising concealing all the macroblocks within the slice marked as error macroblocks.

8. The method of claim 1 wherein handling the error includes discarding remaining data in the slice if the macroblock count is greater than or equal to the slice size and the slice end has not been detected.

9. The method of claim 1 wherein examining a slice or macroblock includes examining a macroblock header to determine an error is present in the macroblock header's syntax and concealing the macroblock header's syntax if an error is present.

10. The method of claim 9 wherein concealing the macroblock header's syntax includes setting a field coding flag for a given macroblock to false if adaptive frame/field (AFF) decoding is not in use.

11. The method of claim 9 wherein, if adaptive frame/field (AFF) coding is in use and a given macroblock is a bottom macroblock in a macroblock pair, concealing the macroblock header's syntax includes setting a field coding flag for the given macroblock equal to the field coding flag value for a top macroblock in the macroblock pair.

12. The method of claim 9, wherein, if adaptive frame/field (AFF) coding is in use, a given macroblock is a top macroblock in a macroblock pair and a macroblock to the left of the given macroblock is not an error macroblock, concealing the macroblock header's syntax includes setting a field coding flag for the given macroblock equal to the field coding flag value for the macroblock to the left of the given macroblock.

13. The method of claim 9, wherein, if adaptive frame/field (AFF) coding is in use, a given macroblock is a top macroblock in a macroblock pair and a macroblock to the left of the given macroblock is not an error macroblock, concealing the macroblock header's syntax includes setting a field coding flag for the given macroblock equal to the field coding flag value for the macroblock to the left of the given macroblock.

14. The method of claim 9, wherein, if adaptive frame/field (AFF) coding is in use, a given macroblock is a top macroblock in a macroblock pair, a macroblock to the left of the given macroblock is an error macroblock and a macroblock to the top of the given macroblock is not an error macroblock, handling the error includes setting a field coding flag for the given macroblock equal to the field coding flag value for the macroblock to the top of the given macroblock.

15. The method of claim 9, wherein, if adaptive frame/field (AFF) coding is in use, a given macroblock is a top macroblock in a macroblock pair, a macroblock to the left of the given macroblock is an error macroblock and a macroblock to the top of the given macroblock is an error macroblock, concealing the macroblock header's syntax includes setting a field coding flag for the given macroblock equal to the field coding flag value for the macroblock to the left of the given macroblock.

16. The method of claim 1 wherein examining a slice or macroblock within the coded picture to determine if there are any errors includes reading decoded macroblock header information for a given macroblock, determining from the decoded macroblock header information whether the given macroblock is an error macroblock.

17. The method of claim 16 wherein handling the error includes concealing the given macroblock if it is determined to be an error macroblock.

18. The method of claim 16, further comprising decoding remaining macroblock data for the given macroblock the given macroblock is determined not to be an error macroblock.

19. The method of claim 18, further comprising determining whether an error is present in the remaining macroblock data.

20. The method of claim 19 wherein handling the error includes concealing the given macroblock if it is determined that an error is present in the remaining macroblock data.

21. The method of claim 1 wherein determining a number of macroblocks in a section includes generating a profile of the streaming data, estimating a number of cycles required for the first or second decoding subtasks based on the profile and basing the number of macroblocks in a section on the estimated number of cycles.

22. The method of claim 21 wherein generating the profile takes place during a network adaptive layer decoding that takes place before the first decoding subtask.

23. The method of claim 1 wherein determining a number of macroblocks in a section includes determining a number of bits in a picture or portion thereof, estimating a number of cycles required for the first or second decoding subtasks based on the estimated number of bits and basing the number of macroblocks in a section on the estimated number of cycles.

24. An apparatus for decoding streaming data containing one or more coded pictures, each picture containing a plurality of slices, each slice containing a plurality of macroblocks, the apparatus comprising:
a processor module having one or more processors;
a memory operably coupled to the processor; and
a set of processor executable instructions adapted for execution by the processor, the processor executable instructions including:
one or more instructions that when executed on the processor determine a number of macroblocks in a section of the coded picture before performing a first decoding subtask on all macroblocks in the section, wherein determining the number of macroblocks in the section includes basing the number of macroblocks in the section on an estimated number of processor cycles required to perform processing of the first decoding subtask or a subsequent second decoding subtask
one or more instructions that when executed on the processor perform the first decoding subtask on all macroblocks in the section; and one or more instructions that when executed on the processor after performing the first decoding subtask on all macroblocks in the section, perform the second decoding subtask on all the macroblocks in the section;
wherein one or more of the first and second tasks includes examining a slice or macroblock within the coded picture to determine if there are any errors, wherein examining a slice or macroblock within the coded picture to determine if there are an errors includes decoding a given macroblock; incrementing a macroblock count;
comparing the macroblock count to a slice size; and determining whether a slice end has been detected for the slice containing the given macroblock and
if an error is present, handling the error;
wherein examining a slice or macroblock includes examining a header for a given macroblock within the picture, and wherein, if an error is detected within the header for the given macroblock, handling the error includes marking the given macroblock as an error macroblock and marking as error macroblocks all macroblocks following the given macroblock until and end of the slice within which the given macroblock is located;
wherein handling the error includes marking the given macroblock and all subsequent macroblocks in the slice as error macroblocks if the macroblock count is less than the slice size and the slice end has been detected.

25. The apparatus of claim 24 wherein the processor module includes two or more processor elements.

26. The apparatus of claim 25 wherein the processor module is a cell processor having one or more synergistic processor elements (SPE), wherein each SPE includes a synergistic processor unit (SPU) and a local store.

27. The apparatus of claim 26 wherein the processor is a SPE and the memory is the local store of the SPE.

28. A non-transitory processor readable medium having embodied therein processor readable instructions for implementing a method for decoding streaming data containing one or more coded pictures, each picture containing a plurality of slices, each slice containing a plurality of macroblocks, the method comprising:
determining a number of macroblocks in a section of the coded picture before performing a first decoding subtask on all macroblocks in the section, wherein determining the number of macroblocks in the section includes basing the number of macroblocks in the section on an estimated number of processor cycles required to perform processing of the first decoding subtask or a subsequent second decoding subtask;
performing the first decoding subtask on all macroblocks in the section; and
after performing the first decoding subtask on all macroblocks in the section, performing the second decoding subtask on all the macroblocks in the section;
wherein one or more of the first and second tasks includes examining a slice or macroblock within the coded picture to determine if there are any errors, wherein examining a slice or macroblock within the coded picture to determine if there are an errors includes decoding a given macroblock; incrementing a macroblock count;
comparing the macroblock count to a slice size; and determining whether a slice end has been detected for the slice containing the given macroblock and
if an error is present, handling the error;
wherein examining a slice or macroblock includes examining a header for a given macroblock within the picture, and wherein, if an error is detected within the header for the given macroblock, handling the error includes marking the given macroblock as an error macroblock and marking as error macroblocks all macroblocks following the given macroblock until and end of the slice within which the given macroblock is located;

wherein handling the error, wherein handling the error includes marking the given macroblock and all subsequent macroblocks in the slice as error macroblocks if the macroblock count is less than the slice size and the slice end has been detected.

29. The method of claim 1, wherein handling the error further includes concealing a plurality of macroblocks marked as error macroblocks after a last error macroblock in a section containing the plurality of macroblocks has been marked.

30. A method for decoding streaming data containing one or more coded pictures, each picture containing a plurality of slices, each slice containing a plurality of macroblocks, the method comprising:

determining a number of macroblocks in a section of the coded picture before performing a first decoding subtask on all macroblocks in the section, wherein determining the number of macroblocks in the section includes basing the number of macroblocks in the section on an estimated number of processor cycles required to perform processing of the first decoding subtask or a subsequent second decoding subtask;

performing the first decoding subtask on all macroblocks in the section; and after performing the first decoding subtask on all macroblocks in the coded picture or a section thereof, performing the second decoding subtask on all the macroblocks in the section;

wherein one or more of the first and second tasks includes examining a slice or macroblock within the coded picture to determine if there are any errors, and if an error is present, handling the error;

wherein examining a slice or macroblock includes examining a header for a given macroblock within the picture, and wherein, if an error is detected within the header for the given macroblock, handling the error includes marking the given macroblock as an error macroblock and marking as error macroblocks all macroblocks following the given macroblock until and end of the slice within which the given macroblock is located;

wherein examining a slice or macroblock includes examining a macroblock header to determine an error is present in the macroblock header's syntax and concealing the macroblock header's syntax if an error is present;

wherein, if adaptive frame/field (AFF) coding is in use and a given macroblock is a bottom macroblock in a macroblock pair, concealing the macroblock header's syntax includes setting a field coding flag for the given macroblock equal to the field coding flag value for a top macroblock in the macroblock pair; or wherein, if adaptive frame/field (AFF) coding is in use, a given macroblock is a top macroblock in a macroblock pair and a macroblock to the left of the given macroblock is not an error macroblock, concealing the macroblock header's syntax includes setting a field coding flag for the given macroblock equal to the field coding flag value for the macroblock to the left of the given macroblock; or wherein, if adaptive frame/field (AFF) coding is in use, a given macroblock is a top macroblock in a macroblock pair and a macroblock to the left of the given macroblock is not an error macroblock, concealing the macroblock header's syntax includes setting a field coding flag for the given macroblock equal to the field coding flag value for the macroblock to the left of the given macroblock; or wherein, if adaptive frame/field (AFF) coding is in use, a given macroblock is a top macroblock in a macroblock pair, a macroblock to the left of the given macroblock is an error macroblock and a macroblock to the top of the given macroblock is not an error macroblock, handling the error includes setting a field coding flag for the given macroblock equal to the field coding flag value for the macroblock to the top of the given macroblock; or wherein, if adaptive frame/field (AFF) coding is in use, a given macroblock is a top macroblock in a macroblock pair, a macroblock to the left of the given macroblock is an error macroblock and a macroblock to the top of the given macroblock is an error macroblock, concealing the macroblock header's syntax includes setting a field coding flag for the given macroblock equal to the field coding flag value for the macroblock to the left of the given macroblock.

31. An apparatus for decoding streaming data containing one or more coded pictures, each picture containing a plurality of slices, each slice containing a plurality of macroblocks, the apparatus comprising:

a processor module having one or more processors;

a memory operably coupled to the processor; and a set of processor executable instructions adapted for execution by the processor, the processor executable instructions including:

one or more instructions that when executed on the processor determine a number of macroblocks in a section of the coded picture before performing a first decoding subtask on all macroblocks in the section, wherein determining the number of macroblocks in the section includes basing the number of macroblocks in the section on an estimated number of processor cycles required to perform processing of the first decoding subtask or a subsequent second decoding subtask;

one or more instructions that when executed on the processor perform the first decoding subtask on all macroblocks in the section; and one or more instructions that when executed on the processor after performing the first decoding subtask on all macroblocks in the section, perform the second decoding subtask on all the macroblocks in the section;

wherein one or more of the first and second tasks includes examining a slice or macroblock within the coded picture to determine if there are any errors, and if an error is present, handling the error;

wherein examining a slice or macroblock includes examining a header for a given macroblock within the picture, and wherein, if an error is detected within the header for the given macroblock, handling the error includes marking the given macroblock as an error macroblock and marking as error macroblocks all macroblocks following the given macroblock until and end of the slice within which the given macroblock is located;

wherein examining a slice or macroblock includes examining a macroblock header to determine an error is present in the macroblock header's syntax and concealing the macroblock header's syntax if an error is present;

wherein, if adaptive frame/field (AFF) coding is in use and a given macroblock is a bottom macroblock in a macroblock pair, concealing the macroblock header's syntax includes setting a field coding flag for the given macroblock equal to the field coding flag value for a top macroblock in the macroblock pair; or wherein, if adaptive frame/field (AFF) coding is in use, a given macroblock is a top macroblock in a macroblock pair and a macroblock to the left of the given macroblock is not an error macroblock, concealing the macroblock header's syntax includes setting a field coding flag for the given macroblock equal to the field coding flag value for the macroblock to the left of the given macroblock; or wherein, if adaptive frame/field (AFF) coding is in use, a given macroblock is a top macroblock in a macroblock pair and a macroblock to the left of the given macroblock is not an error macroblock, concealing the macroblock header's syntax includes setting a field coding flag for the given macroblock equal to the field coding flag value for the macroblock to the left of the given macroblock; or wherein, if adaptive frame/field (AFF) coding is in use, a given macroblock is a top macroblock in a macroblock pair, a macroblock to the left of the given macroblock is an error macroblock and a macroblock to the top of the given macroblock is not an error macroblock, handling the error includes setting a field coding flag for the given macroblock equal to the field coding flag value for the macroblock to the top of the given macroblock; or wherein, if adaptive frame/field (AFF) coding is in use, a given macroblock is a top macroblock in a macroblock pair, a macroblock to the left of the given macroblock is an error macroblock and a macroblock to the top of the given macroblock is an error macroblock, concealing the macroblock header's syntax includes setting a field coding flag for the given macroblock equal to the field coding flag value for the macroblock to the left of the given macroblock.

32. A non-transitory processor readable medium having embodied therein processor readable instructions for implementing a method for decoding streaming data containing one or more coded pictures, each picture containing a plurality of slices, each slice containing a plurality of macroblocks, the method comprising:

determining a number of macroblocks in a section of the coded picture before performing a first decoding subtask on all macroblocks in the section, wherein determining the number of macroblocks in the section includes basing the number of macroblocks in the section on an estimated number of processor cycles required to perform processing of the first decoding subtask or a subsequent second decoding subtask;

performing the first decoding subtask on all macroblocks in the section; and after performing the first decoding subtask on all macroblocks in the coded picture or a section thereof, performing the second decoding subtask on all the macroblocks in the section;

wherein one or more of the first and second tasks includes examining a slice or macroblock within the coded picture to determine if there are any errors, and if an error is present, handling the error;

wherein examining a slice or macroblock includes examining a header for a given macroblock within the picture, and wherein, if an error is detected within the header for the given macroblock, handling the error includes marking the given macroblock as an error macroblock and marking as error macroblocks all macroblocks following the given macroblock until and end of the slice within which the given macroblock is located;

wherein examining a slice or macroblock includes examining a macroblock header to determine an error is present in the macroblock header's syntax and concealing the macroblock header's syntax if an error is present;

wherein, if adaptive frame/field (AFF) coding is in use and a given macroblock is a bottom macroblock in a macroblock pair, concealing the macroblock header's syntax includes setting a field coding flag for the given macroblock equal to the field coding flag value for a top macroblock in the macroblock pair; or wherein, if adaptive frame/field (AFF) coding is in use, a given macroblock is a top macroblock in a macroblock pair and a macroblock to the left of the given macroblock is not an error macroblock, concealing the macroblock header's syntax includes setting a field coding flag for the given macroblock equal to the field coding flag value for the macroblock to the left of the given macroblock; or wherein, if adaptive frame/field (AFF) coding is in use, a given macroblock is a top macroblock in a macroblock pair and a macroblock to the left of the given macroblock is not an error macroblock, concealing the macroblock header's syntax includes setting a field coding flag for the given macroblock equal to the field coding flag value for the macroblock to the left of the given macroblock; or wherein, if adaptive frame/field (AFF) coding is in use, a given macroblock is a top macroblock in a macroblock pair, a macroblock to the left of the given macroblock is an error macroblock and a macroblock to the top of the given macroblock is not an error macroblock, handling the error includes setting a field coding flag for the given macroblock equal to the field coding flag value for the macroblock to the top of the given macroblock; or wherein, if adaptive frame/field (AFF) coding is in use, a given macroblock is a top macroblock in a macroblock pair, a macroblock to the left of the given macroblock is an error macroblock and a macroblock to the top of the given macroblock is an error macroblock, concealing the macroblock header's syntax includes setting a field coding flag for the given macroblock equal to the field coding flag value for the macroblock to the left of the given macroblock.

\* \* \* \* \*